United States Patent [19]

Zinke et al.

[11] Patent Number: 5,670,563

[45] Date of Patent: Sep. 23, 1997

[54] STABILISED CHLORINE-CONTAINING POLYMER COMPOSITIONS

[75] Inventors: Horst Zinke, Reichelsheim/Odw.; Johannes Kaufhold, Lindenfels, both of Germany

[73] Assignee: Ciba-Specialty Chemicals Corporation, Tarrytown, N.Y.

[21] Appl. No.: 503,445

[22] Filed: Jul. 17, 1995

[51] Int. Cl.$^6$ .................................... C08K 5/58
[52] U.S. Cl. ............... 524/182; 252/400.21; 524/137; 524/140; 524/141; 524/146; 524/180; 524/181
[58] Field of Search ..................... 524/180, 181, 524/182, 137, 146, 141, 140; 252/400.21, 400.24, 406, 407

[56] References Cited

U.S. PATENT DOCUMENTS

| | | | |
|---|---|---|---|
| 2,824,847 | 2/1958 | Fath et al. | 524/146 |
| 2,997,454 | 8/1961 | Leistner et al. | 524/151 |
| 3,536,660 | 10/1970 | Looker et al. | 524/146 |
| 3,773,716 | 11/1973 | Rattenbury | 524/137 |
| 3,839,507 | 10/1974 | Hechenbleikner et al. | 524/146 |
| 3,919,165 | 11/1975 | Hechenbleinker | 524/180 |
| 3,978,023 | 8/1976 | Coates | 524/181 |
| 4,146,518 | 3/1979 | Minagawa et al. | 524/181 |
| 4,189,453 | 2/1980 | Zinke et al. | 260/976 |
| 4,536,530 | 8/1985 | Barlow et al. | 524/137 |
| 4,614,756 | 9/1986 | Valdeserri | 524/147 |
| 4,639,482 | 1/1987 | Muller | 524/137 |
| 5,002,702 | 3/1991 | Wolf et al. | 252/400.22 |

FOREIGN PATENT DOCUMENTS

| | | |
|---|---|---|
| 2097566 | 12/1993 | Canada. |
| 90770 | 10/1983 | European Pat. Off.. |
| 573394 | 12/1993 | European Pat. Off.. |
| 2809492 | 9/1978 | Germany. |
| 2809492 | 1/1987 | Germany. |
| 63-86741 | 4/1988 | Japan. |
| 1198355 | 7/1970 | United Kingdom. |

OTHER PUBLICATIONS

The Condensed Chemical Dictionary–10th edition, pp. 1018 & 1019, Van Nostrand Reinhold Co., 1981.

James P. Scullin et al–SPE Transactions, Jan. 1962, pp. 28–31.

Derwent Abstract C93–172749 of EP 573394.

*Primary Examiner*—Veronica P. Hoke
*Attorney, Agent, or Firm*—Michele A. Kovaleski; Victoria M. Malia

[57] ABSTRACT

The invention relates to compositions comprising
  a) a chlorine-containing polymer
  b) at least one organotin compound and
  c) at least one phosphorus compound of formula $$(R_7S)_3P=X_n$$

wherein the meaning of the individual substituents is as defined in the disclosure.

14 Claims, No Drawings

STABILISED CHLORINE-CONTAINING POLYMER COMPOSITIONS

The present invention relates to compositions comprising a chlorine-containing polymer, preferably PVC, an organotin compound and a phosphorus compound as stabiliser, to the use thereof for stabilising chlorine-containing polymers against oxidative, thermal or light induced degradation, and to a process for stabilising PVC mouldings.

The use of some phosphorus compounds together with phenolic antioxidants as stabilisers for chlorine-containing polymers is disclosed, inter alia, in EP-A-90 770.

The use of some organotin compounds together with phosphorus compounds and some further additives as stabilisers for chlorine-containing polymers is disclosed, inter alia, in U.S. Pat. Nos. 3,919,165, 3,978,023, 4,614,756, 5,002,702 and EP-A-573 394.

The known stabilisers and stabiliser mixtures are unable to fulfill the requirements made of the chlorine-containing polymers in all respects.

It has now been found that a selected group of organotin compounds and phosphorus compounds together, without additional stabiliser, are particularly suitable for use as stabilisers for chlorine-containing polymers. The chlorine-containing polymer compositions stabilised in this manner show enhanced properties with respect to stability to heat and light.

Accordingly, the present invention relates to compounds comprising a) a chlorine-containing polymer b) at least one organotin compound of formula I to IV

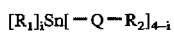

(I)

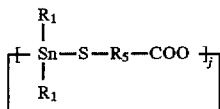

(II)

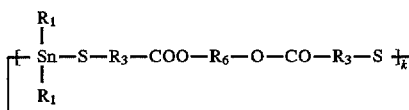

(III)

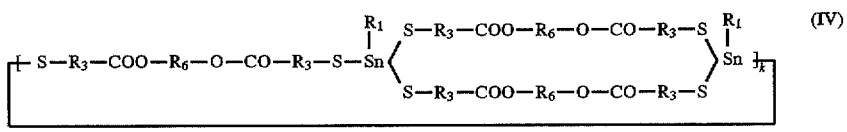

(IV)

wherein
$R_1$ is $C_1$–$C_{12}$alkyl or $C_1$–$C_8$alkoxycarbonylethyl,
Q has the meaning of —S— or —O—CO—, and,
if Q is —S—,
$R_2$ is $C_8$–$C_{18}$alkyl, a radical —$R_3$—COO—$R_4$ or —$(CH_2)_2$—O—CO—$R_4$, or,
if Q is —O—CO—,
$R_2$ is $C_1$–$C_{18}$alkyl, $C_2$–$C_{18}$alkenyl, phenyl which is unsubstituted or substituted by $C_1$–$C_4$alkyl;
$R_3$ is methylene, ethylene or o-phenylene,
$R_4$ is $C_5$–$C_{18}$alkyl,
$R_5$ is methylene, ethylene or o-phenylene,
$R_6$ is $C_2$–$C_4$alkylene or $C_4$–$C_8$alkylene which is interrupted by oxygen,
i is 1 or 2,
j is a number from 1 to 6,
k is a number from 1 to 3, and c) at least one phosphorus compound of formula V $$(R_7S)_3P=X_n \qquad (V)$$

wherein
$R_7$ is $C_4$–$C_{18}$alkyl, phenyl which is unsubstituted or substituted by $C_1$–$C_{12}$alkyl or —$CO_2R_8$; $C_4$–$C_{21}$alkanoyloxyalkyl, $C_3$–$C_{24}$alkoxycarbonylalkyl; $C_3$–$C_{24}$alkoxycarbonylalkyl in which the alkoxycarbonyl moiety is interrupted by oxygen, sulfur,

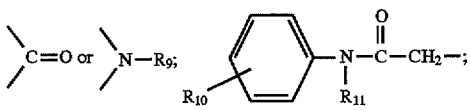

$C_9$–$C_{24}$phenylalkoxycarbonylalkyl which is unsubstituted or substituted in the phenyl ring by $C_1$–$C_{12}$alkyl; $C_9$–$C_{24}$phenylalkoxycarbonylalkyl which is unsubstituted or substituted in the phenyl ring by $C_1$–$C_{12}$alkyl, the bond between the phenyl ring and the alkoxycarbonylalkyl radical being interrupted by oxygen, sulfur,

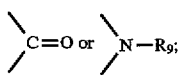

$C_7$–$C_{20}$cycloalkoxycarbonylalkyl or $C_5$–$C_{15}$-cycloalkyl-$C_2$–$C_6$alkoxycarbonyl-$C_1$–$C_{12}$alkyl,
$R_8$ is $C_1$–$C_{18}$alkyl,
$R_9$ is hydrogen or $C_1$–$C_{18}$-alkyl, $R_{10}$ is hydrogen or $C_1$–$C_{12}$alkyl,
$R_{11}$ is hydrogen or $C_1$–$C_{18}$alkyl,
X is oxygen or sulfur, and
n is 0 or 1.

The abbreviated form —COO— or —$CO_2$— used above, throughout the description and in the claims denotes the grouping

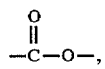

and O—CO— or —OCO— denotes the grouping

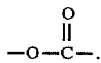

$C_1$–$C_8$Alkoxycarbonylethyl is $C_1$–$C_8$alkyl-O—CO—CH$_2$—CH$_2$—, typically including methoxycarbonylethyl, ethoxycarbonylethyl, n-propoxycarbonylethyl, isopropoxycarbonylethyl, butoxycarbonylethyl, pentoxycarbonylethyl, hexyloxycarbonylethyl, heptyloxycarbonylethyl or octyloxycarbonylethyl.

$R_1$ is preferably methyl, butyl or octyl, in particular n-butyl or n-octyl.

Alkenyl of 2 to 18 carbon atoms is a branched or straight chain radical such as vinyl, propenyl, isopropenyl, 2-butenyl, 3-butenyl, isobutenyl, n-2,4-pentadienyl, 3-methyl-2-butenyl, n-2-octenyl, n-2-dodecenyl, isododecenyl, oleyl, n-2-octadecenyl or n-4-octadecenyl. Alkenyl of 8 to 18 carbon atoms is preferred.

$C_1$–$C_4$Alkyl-substituted phenyl containing preferably 1 to 3, in particular 1 or 2, alkyl groups is typically o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

$C_1$–$C_{18}$Alkylene is a branched or straight-chain radical such as methylene, ethylene, propylene, trimethylene, tetramethylene, pentamethylene, hexamethylene, heptamethylene, octamethylene, decamethylene, dodecamethylene or octadecamethylene. $C_1$–$C_{12}$Alkylene is preferred, in particular $C_1$–$C_8$alkylene. $R_5$ is preferably methylene or ethylene. $R_6$ is preferably ethylene.

$C_4$–$C_8$Alkylene which is interrupted by oxygen is typically —CH$_2$—CH$_2$—O—CH$_2$—CH$_2$—, —CH$_2$—CH$_2$—CH$_2$—O—CH$_2$—CH$_2$—CH$_2$—, —CH$_2$—CH$_2$—O—(CH$_2$)$_4$— or —(CH$_2$)$_4$—O—(CH$_2$)$_4$—, preferably —CH$_2$—CH$_2$—O—CH$_2$—CH$_2$—.

Alkyl of up to and including 18 carbon atoms is a branched or straight-chain radical such as methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl. One of the preferred meanings of $R_1$ is e.g. $C_1$–$C_{12}$alkyl. A particularly preferred meaning of $R_4$ is $C_5$–$C_{18}$alkyl. A particularly preferred meaning of $R_7$ is $C_4$–$C_{18}$alkyl, more particularly $C_6$–$C_{12}$alkyl.

Phenyl substituted by $C_1$–$C_{12}$alkyl or —CO$_2$R$_8$ and containing preferably 1 to 3, in particular 1 or 2, alkyl groups or —CO$_2$R$_8$ is typically o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 2-methoxycarbonylphenyl, 2-ethoxycarbonylphenyl, 2-n-propoxycarbonylphenyl, 2-isopropoxycarbonylphenyl, 2-n-butoxycarbonylphenyl, 2-isobutoxycarbonylphenyl, 2-tert-butoxycarbonylphenyl, 4-methoxycarbonylphenyl, 4-ethoxycarbonylphenyl, 4-n-propoxycarbonylphenyl, 4-isopropoxycarbonylphenyl, 4-n-butoxycarbonylphenyl, 4-isobutoxycarbonylphenyl or 4-tert-butoxycarbonylphenyl. $R_7$ is particularly preferably 2-n-butoxycarbonylphenyl, 2-isobutoxycarbonylphenyl and 2-tert-butoxycarbonylphenyl.

$C_4$–$C_{21}$Alkanoyloxyalkyl is a branched or straight-chain radical such as acetoxyethyl, propionyloxyethyl, butanoyloxyethyl, pentanoyloxyethyl, hexanoyloxyethyl, heptanoyloxyethyl, octanoyloxyethyl, nonanoyloxyethyl, decanoyloxyethyl, undecanoyloxyethyl, dodecanoyloxyethyl, tridecanoyloxyethyl, tetradecanoyloxyethyl, pentadecanoyloxyethyl, hexadecanoyloxyethyl, heptadecanoyloxyethyl, octadecanoyloxyethyl, eicosanoyloxyethyl, docosanoyloxyethyl, acetoxypropyl, propionyloxypropyl, butanoyloxypropyl, pentanoyloxypropyl, hexanoyloxypropyl, heptanoyloxypropyl, octanoyloxypropyl, nonanoyloxypropyl, decanoyloxypropyl, undecanoyloxypropyl, dodecanoyloxypropyl, tridecanoyloxypropyl, tetradecanoyloxypropyl, pentadecanoyloxypropyl, hexadecanoyloxypropyl, heptadecanoyloxypropyl or octadecanoyloxypropyl. Alkanoyloxyethyl of 4 to 18, in particular 4 to 12, carbon atoms is preferred.

$C_3$–$C_{24}$Alkoxycarbonylalkyl is a branched or straight-chain radical such as methoxycarbonylmethyl, ethoxycarbonylmethyl, n-propoxycarbonylmethyl, isopropoxycarbonylmethyl, n-butoxycarbonylmethyl, isobutoxycarbonylmethyl, pentoxycarbonylmethyl, isopentoxycarbonylmethyl, hexyloxycarbonylmethyl, heptyloxycarbonylmethyl, octyloxycarbonylmethyl, decyloxycarbonylmethyl, tetradecyloxycarbonylmethyl, hexadecyloxycarbonylmethyl, methoxycarbonylethyl, ethoxycarbonylethyl, n-propoxycarbonylethyl, isopropoxycarbonylethyl, n-butoxycarbonylethyl, isobutoxycarbonylethyl, pentoxycarbonylethyl, isopentoxycarbonylethyl, hexyloxycarbonylethyl, heptyloxycarbonylethyl, octyloxycarbonylethyl, decyloxycarbonylethyl, tetradecyloxycarbonylethyl, hexadecyloxycarbonylethyl, methoxycarbonylpropyl, ethoxycarbonylpropyl, n-propoxycarbonylpropyl, isopropoxycarbonylpropyl, n-butoxycarbonylpropyl, isobutoxycarbonylpropyl, pentoxycarbonylpropyl, isopentoxycarbonylpropyl, hexyloxycarbonylpropyl, heptyloxycarbonylpropyl, octyloxycarbonylpropyl, decyloxycarbonylpropyl, tetradecyloxycarbonylpropyl, hexadecyloxycarbonylpropyl, methoxycarbonylbutyl, ethoxycarbonylbutyl, n-propoxycarbonylbutyl, isopropoxycarbonylbutyl, n-butoxycarbonylbutyl, isobutoxycarbonylbutyl, pentoxycarbonylbutyl, isopentoxycarbonylbutyl, hexyloxycarbonylbutyl, heptyloxycarbonylbutyl, octyloxycarbonylbutyl, decyloxycarbonylbutyl, tetradecyloxycarbonylbutyl or hexadecyloxycarbonylbutyl. A particularly preferred meaning of $R_7$ is $C_3$–$C_{18}$alkoxycarbonylalkyl, more particularly n-butoxycarbonylethyl or 2-ethylhexyloxycarbonylmethyl.

$C_3$–$C_{24}$Alkoxycarbonylalkyl, wherein the alkoxycarbonyl moiety is interrupted by oxygen, sulfur,

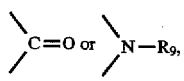

is a branched or straight-chain radical such as methoxyethoxycarbonylmethyl, methoxyethoxycarbonylethyl, ethoxyethoxycarbonylmethyl, ethoxyethoxycarbonylethyl, methoxyethoxycarbonylpropyl, methoxyethoxycarbonylbutyl, ethoxyethoxycarbonylbutyl, butoxyethoxycarbonylmethyl, butoxyethoxycarbonylethyl, butoxycarbonylmethoxycarbonylmethyl, butoxycarbonylmethoxycarbonylethyl, butylthioethoxycarbonylethyl, butylthioethoxycarbonylmethyl, butoxyethoxyethoxycarbonylmethyl, butoxyethoxyethoxycarbonylethyl, butoxyethoxyethoxycarbonylbutyl, diethylaminoethoxycarbonylmethyl, diethylaminoethoxycarbonylethyl, dimethylaminoethoxycarbonylpropyl. A particularly preferred meaning of $R_7$ is $C_3$–$C_{18}$alkoxycarbonylalkyl, wherein the alkoxycarbonyl moiety is interrupted by oxygen or

n-Butoxyethoxycarbonylethyl is most preferred.

$C_9$–$C_{24}$Phenylalkoxycarbonylalkyl which is unsubstituted or substituted in the phenyl ring by $C_1$–$C_{12}$alkyl and which contains preferably 1 to 3, in particular 1 to 2, alkyl groups in the phenyl ring is typically a branched or straight-chain radical such as benzyloxycarbonylmethyl, benzyloxycarbonylethyl, benzyloxycarbonylpropyl, benzyloxycarbonylbutyl, benzyloxycarbonylpentyl, benzyloxycarbonylhexyl, benzyloxycarbonylheptyl, benzyloxycarbonyloctyl, phenylethoxycarbonylmethyl, phenylethoxycarbonylethyl, phenylethoxycarbonylpropyl, phenylethoxycarbonylbutyl, phenylethoxycarbonylpentyl, phenylethoxycarbonylhexyl, phenylethoxycarbonylheptyl, phenylethoxycarbonyloctyl, phenylethoxycarbonylnonyl, phenylethoxycarbonyldecyl, phenylethoxycarbonyldodecyl, phenylpropoxycarbonylmethyl, phenylpropoxycarbonylethyl, phenylpropoxycarbonylbutyl, phenylpropoxycarbonyldodecyl, phenylbutoxycarbonylmethyl, phenylbutoxycarbonylethyl, phenylbutoxycarbonylbutyl, phenylbutoxycarbonylhexyl, phenylpentoxycarbonylmethyl, phenylpentoxycarbonylethyl, phenylpentoxycarbonylbutyl, phenylpentoxycarbonyloctyl, (2-methylbenzyl)oxycarbonylmethyl, (3-methylbenzyl)oxycarbonylethyl, (4-methylbenzyl)oxycarbonylpropyl, (2-ethylbenzyl)oxycarbonylbutyl, (3-ethylbenzyl)oxycarbonylpentyl, (4-ethylbenzyl)oxycarbonylhexyl, (2,4-dimethylbenzyl)oxycarbonylheptyl, (3,5-dimethylbenzyl)oxycarbonyloctyl, (4-tert-butylphenyl)ethoxycarbonylmethyl, (2-methyl-4-tert-butylphenyl)ethoxycarbonylethyl, (4-octylphenyl)ethoxycarbonylpropyl or (4-decylphenyl)ethoxycarbonylbutyl. A particularly preferred meaning of $R_7$ is phenyl-$C_2$–$C_8$alkoxycarbonyl-$C_1$–$C_8$alkyl, more particularly benzyloxycarbonylethyl.

$C_9$–$C_{24}$Phenylalkoxycarbonylalkyl which is unsubstituted or substituted in the phenyl ring by $C_1$–$C_{12}$alkyl and wherein the phenyl ring of the alkoxycarbonylalkyl moiety is interrupted by oxygen, sulfur,

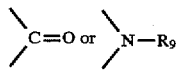

and wherein the phenyl ring preferably contains 1 to 3, in particular 1 to 2, alkyl groups, is typically a branched or straight-chain radical such as phenoxyethoxycarbonylmethyl, phenoxyethoxycarbonylethyl, phenoxyethoxycarbonylpropyl, phenoxyethoxycarbonylbutyl, phenoxyethoxycarbonylpentyl, phenoxyethoxycarbonylhexyl, phenylthioethoxycarbonylmethyl, phenylthioethoxycarbonylethyl, phenylthioethoxycarbonylpropyl, benzoylethoxycarbonylmethyl, benzoylethoxycarbonylethyl, benzoylethoxycarbonylethyl, phenylaminoethoxycarbonylmethyl, phenylaminoethoxycarbonylethyl, (2-methylbenzyl)oxycarbonylmethyl, (3-methylphenoxy)ethoxycarbonylmethyl, (3-methylphenoxy)ethoxycarbonylethyl, (3-methylphenoxy)ethoxycarbonylpropyl, (2,4-dimethylphenoxy)ethoxycarbonylethyl or (4-tert-butylphenoxy)ethoxycarbonylethyl. A particularly preferred meaning of $R_7$ is $C_9$–$C_{18}$phenylalkoxycarbonylalkyl wherein the phenyl ring is unsubstituted or substituted by $C_1$–$C_8$alkyl and the phenyl ring of the alkoxycarbonylalkyl moiety is interrupted by oxygen or

$C_7$–$C_{20}$Cycloalkoxycarbonyl is a branched or straight-chain radical such as cyclopentoxycarbonylmethyl, cyclopentoxycarbonylethyl, cyclopentoxycarbonylpropyl, cyclopentoxycarbonylbutyl, cyclopentoxycarbonylpentyl, cyclopentoxycarbonylhexyl, cyclopentoxycarbonylheptyl, cyclopentoxycarbonyloctyl, cyclopentoxycarbonylnonyl, cyclopentoxycarbonyldecyl, cyclopentoxycarbonylundecyl, cyclopentoxycarbonyldodecyl, cyclohexyloxycarbonylmethyl, cyclohexyloxycarbonylethyl, cyclohexyloxycarbonylpropyl, cyclohexyloxycarbonylbutyl, cyclohexyloxycarbonylpentyl, cyclohexyloxycarbonylhexyl, cyclohexyloxycarbonylheptyl, cyclohexyloxycarbonyloctyl, cyclohexyloxycarbonylnonyl, cyclohexyloxycarbonyldecyl, cyclohexyloxycarbonylundecyl, cyclohexyloxycarbonyldodecyl, cycloheptyloxycarbonylmethyl, cycloheptyloxycarbonylethyl, cycloheptyloxycarbonylpropyl, cycloheptyloxycarbonylbutyl, cycloheptyloxycarbonylpentyl, cycloheptyloxycarbonylhexyl, cycloheptyloxycarbonylheptyl, cycloheptyloxycarbonyloctyl, cycloheptyloxycarbonylnonyl, cycloheptyloxycarbonyldecyl, cycloheptyloxycarbonylundecyl, cycloheptyloxycarbonyldodecyl, cyclooctyloxycarbonylethyl, cyclooctyloxycarbonylethyl or bicyclo[2.2.2]octyloxycarbonylethyl. A particularly preferred meaning of $R_7$ is $C_7$–$C_{15}$cycloalkoxycarbonylalkyl, more particularly $C_7$–$C_{12}$cycloalkoxycarbonylalkyl, e.g. cyclohexyloxycarbonylethyl.

$C_5$–$C_{15}$Cycloalkyl-$C_2$–$C_6$alkoxycarbonyl-$C_1$–$C_{12}$alkyl of 8 to 33 carbon atoms is a branched or straight-chain radical such as cyclopentylmethoxycarbonylmethyl, cyclopentylmethoxycarbonylethyl, cyclopentylmethoxycarbonylpropyl, cyclopentylmethoxycarbonylbutyl, cyclopentylmethoxycarbonylpentyl, cyclopentylmethoxycarbonylhexyl, cyclopentylmethoxycarbonylheptyl,
cyclopentylmethoxycarbonyloctyl,
cyclopentylmethoxycarbonylnonyl,
cyclopentylmethoxycarbonyldecyl,
cyclopentylmethoxycarbonylundecyl,
cyclopentylmethoxycarbonyldodecyl,
cyclohexylmethoxycarbonylmethyl,
cyclohexylmethoxycarbonylethyl,
cyclohexylmethoxycarbonylpropyl,
cyclohexylmethoxycarbonylbutyl,
cyclohexylmethoxycarbonylpentyl,
cyclohexylmethoxycarbonylhexyl,
cyclohexylmethoxycarbonylheptyl,
cyclohexylmethoxycarbonyloctyl,
cyclohexylmethoxycarbonylnonyl,
cyclohexylmethoxycarbonyldecyl,
cyclohexylmethoxycarbonylundecyl,
cyclohexylmethoxycarbonyldodecyl,
cycloheptylmethoxycarbonylmethyl,
cycloheptylmethoxycarbonylethyl,
cycloheptylmethoxycarbonylpropyl,
cycloheptylmethoxycarbonylbutyl,
cycloheptylmethoxycarbonylpentyl,
cycloheptylmethoxycarbonylhexyl,
cycloheptylmethoxycarbonylheptyl,
cycloheptylmethoxycarbonyloctyl,
cycloheptylmethoxycarbonylnonyl,
cycloheptylmethoxycarbonyldecyl,
cycloheptylmethoxycarbonylundecyl,
cycloheptylmethoxycarbonyldodecyl,
cyclooctylmethoxycarbonylethyl,
cyclooctylmethoxycarbonylethyl, bicyclo[2.2.2]
octylmethoxycarbonylethyl,
cyclopentylethoxycarbonylmethyl,
cyclopentylethoxycarbonylethyl,
cyclopentylpropoxycarbonylpropyl,
cyclopentylbutoxycarbonylbutyl,
cyclopentylpentoxycarbonylpentyl,
cyclopentylethoxycarbonylhexyl,
cyclopentylethoxycarbonylheptyl,
cyclopentylethoxycarbonyloctyl,
cyclopentylethoxycarbonylnonyl,
cyclopentylethoxycarbonyldecyl,
cyclopentylethoxycarbonylundecyl,
cyclopentylethoxycarbonyldodecyl,
cyclohexylpentoxycarbonylmethyl,
cyclohexylbutoxycarbonylethyl,
cyclohexylbutoxycarbonylpropyl,
cyclohexylpropoxycarbonylbutyl,
cyclohexylpropoxycarbonylpentyl,
cyclohexylethoxycarbonylhexyl,
cyclohexylethoxycarbonylheptyl,
cyclohexylethoxycarbonyloctyl,
cyclohexylpentoxycarbonylnonyl,
cyclohexylpentoxycarbonyldecyl,
cyclohexylethoxycarbonylundecyl,
cyclohexylethoxycarbonyldodecyl,
cycloheptylethoxycarbonylmethyl,
cycloheptylpentoxycarbonylethyl,
cycloheptylbutoxycarbonylpropyl,
cyclohexylpropoxycarbonylbutyl,
cycloheptylethoxycarbonylpentyl,
cycloheptylethoxycarbonylhexyl,
cycloheptylethoxycarbonylheptyl,
cycloheptylethoxycarbonyloctyl,
cycloheptylethoxycarbonylnonyl,
cycloheptylethoxycarbonyldecyl, cycloheptylpropoycarbonylundecyl,
cycloheptylpentoxycarbonyldodecyl, cyclooctylethoxycarbonylethyl or cyclooctylethoxycarbonylethyl. $C_5-C_{15}$Cycloalkyl-$C_2-C_6$alkoxycarbonyl-$C_1-C_{12}$alkyl is also taken to be bridged ring systems such as bicyclo[2.2.2] octylethoxycarbonylethyl or the compounds (100) and (101) in Table 1. a particularly preferred meaning of $R_7$ is $C_5-C_{15}$cycloalkyl-$C_2-C_4$alkoxycarbonyl-$C_1-C_8$alkyl, more particularly $C_5-C_{15}$cycloalkyl-$C_2-C_4$alkoxycarbonyl-$C_1-C_4$alkyl of 8 to 23 carbon atoms, e.g. $C_5-C_{10}$cycloalkylmethoxycarbonylethyl.

Component b) may also be a mixture of different organotin compounds of formulae I to IV.

Likewise component c) may be composed of a mixture of different phosphorus compounds of formula V.

Interesting compositions are those comprising as component c) at least one phosphorus compound of formula V, wherein $R_7$ is $C_4-C_{18}$alkyl, phenyl which is unsubstituted or substituted by $C_1-C_{12}$alkyl or $-CO_2R_8$; $C_4-C_{21}$alkanoyloxyalkyl, $C_3-C_{24}$alkoxycarbonylalkyl; $C_3-C_{24}$alkoxycarbonylalkyl in which the alkoxycarbonyl moiety is interrupted by oxygen, sulfur,

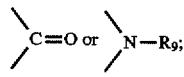

$C_9-C_{24}$phenylalkoxycarbonylalkyl which is unsubstituted or substituted in the phenyl ring by $C_1-C_{12}$alkyl; $C_9-C_{24}$phenylalkoxycarbonylalkyl which is unsubstituted or substituted in the phenyl ring by $C_1-C_{12}$alkyl, the bond between the phenyl ring and the alkoxycarbonylalkyl radical being interrupted by oxygen, sulfur or

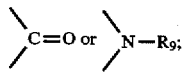

$C_7-C_{20}$cycloalkoxycarbonylalkyl or $C_5-C_{15}$cycloalkyl-$C_2-C_6$alkoxycarbonyl-$C_1-C_{12}$alkyl.

Interesting compositions are those comprising as component b) at least one organotin compound of formula I to IV, wherein
$R_1$ is $C_1-C_{12}$alkyl,
if Q is —S—,
$R_2$ is $C_8-C_{18}$alkyl or a radical —$R_3$—COO—$R_4$, or,
if Q is —O—CO—,
$R_2$ is $C_7-C_{18}$alkyl, $C_8-C_{18}$alkenyl or phenyl;
$R_3$ is methylene or ethylene,
$R_4$ is $C_5-C_{18}$alkyl,
$R_5$ is ethylene or o-phenylene,
$R_6$ is $C_2-C_4$alkylene, or $C_4-C_8$alkylene which is interrupted by oxygen,
i is 1 or 2,
j is a number from 1 to 4, and
k is 1 or 2.

Preferred compounds are those comprising as component b) at least one organotin compound of formula I to IV, wherein
$R_1$ is $C_4-C_8$alkyl,
if Q is —S—,
$R_2$ is a radical —$R_3$—COO—$R_4$, or,
if Q is —O—CO—,
$R_2$ is $C_7-C_{11}$alkyl;
$R_3$ is methylene or ethylene, $R_4$ is $C_8$–$C_{14}$alkyl,
$R_5$ is ethylene,
$R_6$ is ethylene,
i is 1 or 2,
j is a number from 1 to 4, and
k is 1 or 2.

Also preferred are compositions comprising as component b) at least one organotin compound of formula I or III.

Interesting compositions are also those comprising as component c) at least one phosphorus compound of formula V, wherein
$R_7$ is $C_4$–$C_{12}$alkyl, phenyl which is unsubstituted or substituted by $C_1$–$C_8$alkyl or —$CO_2R_8$; $C_4$–$C_{12}$alkanoyloxyalkyl, $C_3$–$C_{18}$alkoxycarbonylalkyl; $C_3$–$C_{18}$alkoxycarbonylalkyl in which the alkoxycarbonyl moiety is interrupted by oxygen or

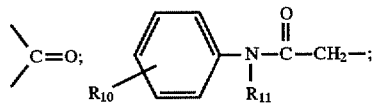

$C_9$–$C_{18}$phenylalkoxycarbonylalkyl which is unsubstituted or substituted in the phenyl ring by $C_1$–$C_8$alkyl; $C_9$–$C_{18}$phenylalkoxycarbonylalkyl which is unsubstituted or substituted in the phenyl ring by $C_1$–$C_8$alkyl, the bond between the phenyl ring and the alkoxycarbonylalkylradical being interrupted by oxygen or

$C_7$–$C_{15}$cycloalkoxycarbonylalkyl or $C_5$–$C_{15}$cycloalkyl-$C_2$–$C_4$alkoxycarbonyl-$C_1$–$C_8$alkyl,
$R_8$ is $C_1$–$C_{12}$alkyl,
$R_9$ is hydrogen or $C_1$–$C_{12}$alkyl,
$R_{10}$ is hydrogen or $C_1$–$C_8$alkyl,
$R_{11}$ is hydrogen or $C_1$–$C_{12}$alkyl,
X is oxygen or sulfur, and
n is 0 or 1.

Particularly interesting compositions are those comprising as component c) at least one phosphorus compound of formula V, wherein
$R_7$ is $C_4$–$C_8$alkyl, phenyl which is unsubstituted or substituted by $C_1$–$C_4$alkyl or —$CO_2$; $C_3$–$C_{18}$alkoxycarbonylalkyl, $C_3$–$C_{12}$alkoxycarbonylalkyl in which the alkoxycarbonyl moiety is interrupted by oxygen or

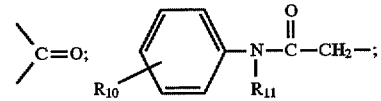

$C_9$–$C_{15}$-phenylalkoxycarbonylalkyl which is unsubstituted or substituted in the phenyl ring by $C_1$–$C_4$alkyl; $C_7$–$C_{12}$cycloalkoxycarbonylalkyl or $C_5$–$C_{15}$cycloalkyl-$C_2$–$C_4$alkoxycarbonyl-$C_1$–$C_4$alkyl,
$R_8$ is $C_1$–$C_8$alkyl,
$R_9$ is hydrogen or $C_1$–$C_{12}$alkyl,
$R_{10}$ is hydrogen or $C_1$–$C_4$alkyl,
$R_{11}$ is hydrogen or $C_1$–$C_4$alkyl,
X is oxygen or sulfur, and
n is 0 or 1.

Of preeminent interest are compositions comprising as component c) at least one phosphorus compound of formula V, wherein $R_7$ is phenyl which is unsubstituted or substituted by —$CO_2R_8$; $C_3$–$C_{15}$alkoxycarbonylalkyl, $C_3$–$C_9$alkoxycarbonylalkyl in which the alkoxycarbonyl moiety is interrupted by oxygen or

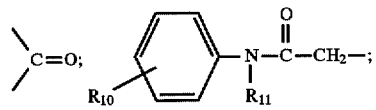

$C_9$–$C_{12}$phenylalkoxycarbonylalkyl, cyclohexyloxycarbonylethyl or $C_5$–$C_{10}$cycloalkylmethoxycarbonylethyl, and
$R_8$ is $C_1$–$C_4$alkyl,
$R_9$ is hydrogen or $C_1$–$C_8$alkyl,
$R_{10}$ is hydrogen,
$R_{11}$ is $C_1$–$C_4$alkyl,
X is oxygen or sulfur, and
n is 0 or 1.

Particularly preferred organotin compounds of formula I are $(CH_3CH_2CH_2CH_2)_2Sn(SCH_2CO_2CH_2CH(CH_2CH_3)CH_2CH_2CH_2CH_3)_2$ [dibutyltin-bis(2-ethylhexylthioglycolate)], $CH_3CH_2CH_2CH_2Sn(SCH_2CO_2CH_2CH(CH_2CH_3)CH_2CH_2CH_2CH_3)_3$ [monobutyltin-tris(2-ethylhexylthioglycolate)] or $(CH_3CH_2CH_2CH_2)_2Sn(O—CO—C_7H_{15})_2$ [dibutyltin-bis(isooctoate)].

Illustrative examples of preferred phosphorus compounds of formula V having the structural types A, B, C and D are shown in Table 1.

$$[R'—O—\overset{O}{\overset{\|}{C}}—CH(CH_3)—S]_3P=X_n \quad (A)$$

$$(R''S)_3P=X_n \quad (B)$$

$$[R'—O—\overset{O}{\overset{\|}{C}}—CH_2—S]_3P=X_n \quad (C)$$

$$[R'—O—\overset{O}{\overset{\|}{C}}—CH_2—CH_2—S]_3P=X_n \quad (D)$$

TABLE 1

| Cmpd | Type | R' or R" | n | X | $n_D^{20}$ |
|---|---|---|---|---|---|
| 100 | A | 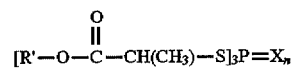 | 1 | O | 1.5457 (at 30° C.) |
| 101 | A | | 0 | — | 1.5493 |
| 102 | A | n-$C_4H_9CH(C_2H_5)$—$CH_2$— | 1 | S | 1.5096 |
| 103 | A | | 1 | O | 1.4937 |
| 104 | C | | 0 | — | 1.5060 |
| 105 | C | | 1 | O | 1.4992 |
| 106 | C | | 1 | S | 1.5159 |
| 107 | A | n-$C_{12}H_{25}$— | 1 | O | 1.4879 |
| 108 | A | n-$C_4H_9$—O—$CH_2$—$CH_2$— | 1 | O | 1.4936 |
| 109 | A | 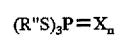 | 1 | O | 1.5804 |
| 110 | B | 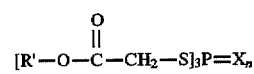 | 0 | — | m.p. 54–56° C. |
| 111 | B |  | 1 | O | 1.5922 (at 30° C.) |

TABLE 1-continued

| Cmpd | Type | R' or R" | n | X | $n_D^{20}$ |
|------|------|----------|---|---|------------|
| 112 | C | n-C$_4$H$_9$—OCO—CH$_2$— | 1 | S | 1.5217 |
| 113 | D | n-C$_6$H$_{13}$— | 1 | O | 1.5015 |
| 114 | C | CH$_3$— | 1 | S | 1.888 |
| 115 | B | n-C$_{12}$H$_{25}$— | 1 | — | 1.499 (at 25° C.) |
| 116 | B | 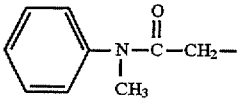 | 1 | S | m.p. 88–89° C.[a] |

[a]DE-C-2 809 492 (CIBA-GEIGY AG), page 14, Example No. 20.

Also particularly preferred are compositions as indicated above, comprising dibutyltin-bis(2-ethylhexylthioglycolate), monobutyltin-tris(2-ethylhexylthioglycolate) and tris(2-ethylhexyloxycarbonylmethylthio)phosphate (compound (105), Table 1).

Compositions comprising dibutyltin-bis(isooctoate) and tris(2-ethylhexyloxycarbonylmethylthio)phosphate (compound (105), Table 1) are of very particular interest.

Components b) and c) of the composition are known by themselves and can be prepared by known methods. Thus, for example, the organotin compounds are described in Houben-Weyl, "Methoden der Organischen Chemie", Georg Thieme Verlag, Stuttgart 1978, vol. 13/6, p. 294ff, A. K. Sawyer, "Organolin Compounds", Marcel Dekker Inc., New York 1971, Vol. I, Chapters II and III and Vol. II, p. 264, and W. P. Neumann, "Die Organische Chemie des Zinns", Ferdinand Enke Verlag, Stuttgart 1967, p. 131.

A more detailed description of the phosphorus compounds will be found, for example, in Houben-Weyl, "Methoden der Organischen Chemie", Georg Thieme Verlag, Stuttgart 1964, Vol. 12/2, p. 93ff and 742ff, and in U.S. Pat. No. 4,189,453.

Illustrative examples of chlorine-containing polymers are: polymers of vinyl chloride, vinyl resins containing vinyl chloride units in their structure, e.g. copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber hydrochloride and chlorinated rubber hydrochloride; and mixtures of said polymers with one another or with other polymerisable compounds.

Chlorine-containing polymers also comprise graft polymers of PVC with EVA, ABS and MBS. Preferred substrates are also mixtures of the abovementioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM and polylactones.

The particularly preferred chlorine-containing polymer is polyvinyl chloride, in particular as suspension or bulk polymer.

Useful polymer compositions are those as described above which contain from 0.05 to 5%, in particular from 0.1 to 5%, e.g. 0.1 to 2%, of components (b) and (e) together, based on the weight of component (a).

Also preferred are compositions wherein the weight ratio of the components (b):(c) is from 4:1 to 1:1.

Farther additives can also be incorporated before or during the incorporation of the stabilisers, depending on the end-use of the polymer, e.g. lubricants, pigments, modifiers (such as impact-strength modifiers), processing auxiliaries, fillers, antioxidants and/or light stabilisers.

The chlorine-containing polymer may contain a plasticiser, but chlorine-containing polymers containing no plasticiser are preferred.

The novel compositions may also contain further customary stabilisers for chlorine-containing thermoplasts.

Furthermore, the compositions may contain conventional antioxidants, light stabilisers and UV absorbers. Illustrative examples thereof are:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thio-bis(6-tert-butyl-2-methylphenol), 4,4'-thiobis(3,6-di-sec-amylphenol), 4,4'-bis(2,6-dimethyl-4-hydroxyphenyl) disulfide.

1.5. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2'-ethylidene-bis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylene bis(2,6-di-tert-butylphenol), 4,4'-methylenebis (6-tert-butyl-2-methylphenol), 1,1-bis(5-tert-butyl-4- hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.7. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, his[4-(1,1,3,3-tetramethylbutyl)phenyl]-2,2-bis(3,5-di-tert-butyl-4-hydroxybenzyl)malonate.

1.8. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.11. Acylaminophenols, for example 4-hydroxylauranilide, 4-hydroxystearanilide, octyl N-(3,5-di-tert-butyl-4-hydroxyphenyl) carbamate.

1.12. Esters of β-(3,5-di-tert-butyl-4-hydroxyphenyl) propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of β-(5-tert-butyl-4-hydroxy-3-methylphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl) propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenyl acetic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxy-benzoate.

2.4. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazasprio[4,5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione.

2.5. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine.

3. Fillers and reinforcing agents, for example, calcium carbonate, silicates, glass fibres, talc, kaolin, mica, barium sulfate, metal oxides and hydroxides, carbon black, graphite.

4. Other additives, for example, plasticisers, lubricants, emulsifiers, pigments, antistatic agents, blowing agents and impact modifier.

In addition to the indicated stabilisers and costabilisers of this invention, it is also possible to use epoxy compounds such as 1,2-epoxides and oxiranes in mounts of, for example, up to and including 10 parts by weight, expediently up to and including 5 parts by weight and, preferably, from 0.01 to 2 parts by weight, based on 100 parts by weight of the composition.

Illustrative examples of thereof are epoxidised polybutadiene, epoxidised soybean oil, epoxidised linseed oil, epoxidised rape oil, epoxidised tallow, methylbutyl or 2-ethylhexyl epoxystearate, tris(epoxypropyl)isocyanurate, epoxidised castor oil, epoxidised sunflower oil, 3-(2-xenoxy)-1,2-epoxypropane, a polyglycidyl ether of bisphenol A, vinylcyclohexene diepoxide, dicyclopentadiene diepoxide and 3,4-epoxycyclohexylmethyl-3,4-epoxycyclohexanecarboxylate.

The novel compositions can be prepared in a manner known per se. In general, the stabiliser system is incorporated into the polymer using per se known apparatus, such as calenders, mixers, kneaders and the like.

The incorporation of the stabiliser components into the chlorine-containing polymer is best effected, as usual, on a mixer roll, e.g. on a 2-roll mill in the temperature range from 150° to 200° C. Sufficient homogenisation is usually achieved over 5 to 15 minutes. The components can be added singly or together as a premix. A liquid premix has been found useful, i.e. the incorporation is carried out in the presence of inert solvents and/or plasticisers.

The compositions stabilised according to the present invention can be brought into the desired shape in known manner. Such methods typically include grinding, calendering, extrusion or injection moulding, and also extrusion blow moulding or processing by the plastisol process. The compositions can also be processed to foams.

Preferred stabilised chlorine-containing polymer compositions are unplasticised or plasticiser-free or essentially plasticiser-free compositions:

The novel compositions are particularly suitable, in the form of rigid formulations, for hollow articles (bottles), packaging films (thermoforming films), blown films, crash-pad films (automobiles), tubes, foams, heavy profiles (window flames), light-wall profiles, building profiles, sidings, fittings, office films and apparatus housings (computers and domestic appliances).

Other compositions, in the form of flexible formulations, are wire sheaths, cable insulations, decorative films, roof sheeting, foams, agricultural sheeting, tubes, sealing profiles, office films and sheeting for inflated tents and vehicle interiors.

Examples of the use of the compositions according to the invention as plastisols are artificial leather, flooring, textile coatings, wall coverings, coil coatings and automotive underseal.

Examples of sintered PVC applications of the compositions according to the invention are slush, slush mould and coil coatings.

The above-described polymer compositions are preferably used as rigid profiles for external applications and as rigid films.

The invention further relates to the use of at least one compound of formulae I to IV and at least one compound of formula V as stabilisers for protecting chlorine-containing polymers against oxidative, thermal or light-induced degradation.

The present invention also relates to a process for stabilising a chlorine-containing polymer against oxidative, thermal or light-induced degradation, which comprises incorporating into, or applying to, said polymer at least one compound of formulae I to IV and a compound of formula V.

The present invention also relates to a stabiliser mixture comprising at least one organotin compound of formulae I to IV and at least one phosphorus compound of formula V.

The preferred organotin compounds of formula I to IV and phosphorus compounds of formula V for use as stabilisers, the process for stabilising and the stabiliser mixture are identical to those described for the composition comprising a chlorine-containing polymer.

The following Examples illustrate the invention in more detail. Parts or percentages are by weight.

EXAMPLE 1

Continuous Rolling Test at 190° C. and Artificial Weathering

The formulation used is one for rigid PVC profiles for outdoor utilities. The composition is subjected to a continuous rolling test and an artificial weathering test to determine the stabiliser action in PVC.

A dry mixture consisting of 100.0 parts of polyvinyl chloride (S-PVC, K value 60), 0.2 part of montanate and 1.6 parts of a novel stabiliser composition according to Table 2 (Example 1a and Example 1b) is plastified on a mixer roll for 5 minutes at 190° C.

TABLE 2

| Stabiliser composition | Example 1a | Example 1b |
|---|---|---|
| dibutyltin-bis(2-ethylhexylthio-glycolate) | 0.8 part | — |
| monobutyltin-tris(2-ethylhexylthio-glycolyt) | 0.3 part | — |
| dibutyltin-bis(i-octoate) | — | 1.1 parts |
| tris(2-ethylhexyloxycarbonylmethyl-thio)phosphate | 0.5 part | 0.5 part |

Subsequently, test samples of 0.3 mm thickness are cut out of the centre of the sheet at intervals of 5 minutes. The Yellowness Index (YI) of these test samples is determined according to ASTDM 1925-70. Low YI values denote minor discoloration, high values denote strong discoloration of the samples. The slighter the discoloration, the more effective the stabiliser composition. The results are reported in Table 3.

TABLE 3

| Continuous rolling, YI values at 5 minute intervals | | | | | | | | | |
|---|---|---|---|---|---|---|---|---|---|
| | Duration (minutes) | | | | | | | | |
| Example | 5 | 10 | 15 | 20 | 25 | 30 | 35 | 40 | 45 | 50 |
| Example 1a | 1.9 | 3.7 | 4.4 | 5.8 | 8.1 | 9.8 | 16.0 | 37.4 | 68.4 | 101.9 |
| Example 1b | 8.2 | 15.8 | 20.8 | 29.1 | 43.6 | 66.0 | 130.5 | | | |

The samples for the artificial weathering test are prepared by plastifying the above compositions on a mixer roll for 5 minutes at 190° C. Sheets of 0.5 mm thickness are compression-moulded from the rough sheet so obtained. These sheets are subjected to an artificial weathering test. The radiation source is an Ultra-Vitalux® 300 W lamp, supplied by OSRAM Gmbh. The black standard temperature is 65° C. The samples are irradiated periodically at room temperature for 16 hours dry, and under water for 8 hours. The Yellowness Index (YI) of these samples is determined according to ASTDM 1925-70. Low values denote minor discoloration, high values denote strong discoloration of the samples. The slighter the discoloration, the more effective the stabiliser composition. The results are reported in Table 4.

TABLE 4

| Artificial weathering test, YI values after irradiation | | | | | | | | |
|---|---|---|---|---|---|---|---|---|
| | Duration (hours) | | | | | | | |
| Example | 0 | 24 | 100 | 200 | 300 | 400 | 500 | 600 |
| Example 1a | 5.9 | 12.9 | 315 | 42.0 | 56.1 | 75.8 | 86.3 | |
| Example 1b | 12.4 | 22.3 | 31.3 | 38.6 | 57.3 | 64.3 | 69.5 | 94.6 |

EXAMPLE 2

Heat Test at 190° C. and Artificial Weathering

In general analogy to Example 1a, a formulation for rigid PVC profile for outdoor utilities is used. The composition is subjected to a heat test and an artificial weathering test to determine the stabiliser action in PVC.

A dry mixture comprising 100.0 pans of polyvinyl chloride (S-PVC, K value 60), 0.2 part of montanate, 1.0 part of glycerol monooleate and 1.6 parts of a novel stabiliser composition according to Table 5 (Example 2a to Example 2g) is plastified on a mixer roll for 5 minutes at 190°.

TABLE 5

| | Stabiliser composition | |
|---|---|---|
| Example | Dibutyltin-bis(2-ethyl-hexylthioglycolate) | Phosphorus compound according to Table 1 |
| Example 2a | 1.1 parts | 0.5 part (105) |
| Example 2b | 1.1 parts | 0.5 part (106) |
| Example 2c | 1.1 parts | 0.5 part (108) |
| Example 2d | 1.1 parts | 0.5 part (110) |
| Example 2e | 1.1 parts | 0.5 part (111) |
| Example 2f | 1.1 parts | 0.5 part (115) |
| Example 2g | 1.1 parts | 0.5 part (116) |

Subsequently, test samples of 0.2 mm thickness are cut out of the centre of the sheet at intervals of 5 minutes and subjected to heat in a Mathis Thermo Tacter at 190° C. for the time indicated in Table 6. The Yellowness Index (YI) of these test samples is determined according to ASTDM 1925-70. Low YI values denote minor discoloration, high values denote strong discoloration of the samples. The slighter the discoloration, the more effective the stabiliser composition. The results are reported in Table 6.

TABLE 6

Heat test, YI values after heating at 190° C.

| | Duration (minutes) | | | | | |
|---|---|---|---|---|---|---|
| Example | 0 | 10 | 20 | 30 | 40 | 50 |
| Example 2a | 11.3 | 17.5 | 22.1 | 38.1 | 94.4 | 159.0 |
| Example 2b | 15.1 | 20.2 | 24.9 | 27.8 | 75.4 | 140.1 |
| Example 2c | 13.2 | 18.2 | 22.2 | 33.1 | 87.1 | 154.4 |
| Example 2d | 13.1 | 19.3 | 21.4 | 36.8 | 79.4 | 158.9 |
| Example 2e | 14.1 | 18.8 | 25.2 | 39.9 | 104.0 | — |
| Example 2f | 14.6 | 22.5 | 27.8 | 38.8 | 90.0 | — |

The test samples for the artificial weathering test are prepared by plastifying the above compositions on a mixer roll for 5 minutes at 190° C. Sheets of 0.5 mm thickness are compression-moulded from the rough sheet so obtained. These sheets are subjected to an artificial weathering test. The radiation source is an Ultra-Vitalux® 300 W lamp, supplied by OSRAM Gmbh. The black standard temperature is 65° C. The samples are irradiated periodically at room temperature for 16 hours dry, and under water for 8 hours. The Yellowness Index (YI) of these samples is determined according to ASTDM 1925-70. Low values denote minor discoloration, high values denote strong discoloration of the samples. The slighter the discoloration, the more effective the stabiliser composition. The results are reported in Table 7.

TABLE 7

Artificial weathering test, YI values after irradiation

| | Duration (hours) | | | | |
|---|---|---|---|---|---|
| Example | 0 | 24 | 100 | 200 | 300 |
| Example 2a | 18.6 | 26.2 | 33.3 | 52.8 | 101.0 |
| Example 2b | 22.7 | 28.3 | 36.7 | 54.6 | 140.0 |
| Example 2c | 20.1 | 30.2 | 40.8 | 58.4 | 120.0 |
| Example 2d | 19.4 | 26.4 | 54.7 | 71.6 | 127.0 |
| Example 2e | 22.2 | 31.5 | 58.6 | 70.2 | 122.0 |
| Example 2f | 21.4 | 33.3 | 49.4 | 68.9 | 100.0 |

EXAMPLE 3

Heat and Continuous Rolling Test, and Artificial Weathering of Impact Modified Rigid PVC A formulation for rigid PVC profiles for outdoor utilities is used. The composition is subjected to a heat and continuous rolling test, and to an artificial weathering test, to determine the stabiliser action in PVC.

A dry mixture consisting of 100.0 parts of polyvinyl chloride (S-PVC, K value 60), 10 parts of acrylate modifier (impact modifier), 0.5 part of epoxidised soybean oil, 1.5 parts of flow control agent (PMMA), 0.6 part of wax ester, 0.8 part of polyol ester, 0.1 part of paraffin and 2.7 parts of a novel stabiliser composition according to Table 8 (Examples 3a, 3b and 3c) is plastified on a mixer roll for 5 minutes at 180° C.

TABLE 8

| | Stabiliser composition | | |
|---|---|---|---|
| Example | Dibutyltin-bis(2-ethylhexyl-thioglycolate) | Monobutyltin-tris(2-ethylhexyl-thioglycolate) | Tris(2-ethylhexyloxy-carbonylmethylthio)-phosphate (cmpd 105) |
| Example 3a | 2.0 parts | — | 0.7 part |
| Example 3b | — | 2.0 parts | 0.7 part |
| Example 3c | 1.0 parts | 1.0 part | 0.7 part |

Subsequently, test samples of 0.2 mm thickness are cut out of the centre of the sheet at intervals of 5 minutes and subjected to heat in a Mathis Thermo Tacter at 190° C. for the time indicated in Table 9. The Yellowness Index C/I) of these test samples is determined according to ASTDM 1925-70. Low YI-values denote minor discoloration, high values denote strong discoloration of the samples. The slighter the discoloration, the more effective the stabiliser composition. The results are reported in Table 9.

TABLE 9

Heat test, YI values after heating at 190° C.

| | Duration (minutes) | | | | | |
|---|---|---|---|---|---|---|
| Example | 0 | 10 | 20 | 30 | 40 | 50 |
| Example 3a | 16.7 | 17.6 | 20.1 | 33.1 | 83.5 | — |
| Example 3b | 5.7 | 5.5 | 8.0 | 15.1 | 28.2 | 61.1 |
| Example 3c | 6.2 | 6.3 | 8.2 | 13.2 | 23.7 | 54.1 |

The continuous rolling test is carded out at 180° C. by first plastifying the composition indicated above on a mixer roll in 5 minutes and then cutting samples from the centre of the sheet (0.3 mm thickness) at intervals of 5 minutes. The Yellowness Index of the samples is determined according to ASTDM 1925-70. The results are reported in Table 10.

TABLE 10

Continuous rolling test YI values at 5 minute intervals

| | Duration (minutes) | | | | | | | | |
|---|---|---|---|---|---|---|---|---|---|
| Example | 5 | 10 | 15 | 20 | 25 | 30 | 35 | 40 | 45 |
| Example 3a | 8.0 | 14.6 | 17.9 | 20.7 | 26.0 | 35.6 | 60.1 | 113.7 | — |
| Example 3b | 5.7 | 6.3 | 7.8 | 10.2 | 18.7 | 33.6 | 52.6 | 69.3 | 90.2 |
| Example 3c | 5.6 | 6.8 | 7.8 | 9.7 | 12.7 | 18.4 | 30.2 | 56.9 | 103.5 |

The test samples for the artificial weathering test are prepared by plastifying the above compositions on a mixer roll for 10 minutes at 190° C. Sheets of 0.5 mm thickness are compression-moulded at 180° C. from the rolled sheet so obtained. These sheets are subjected to an artificial weathering test. The radiation source is an Ultra-Vitalux® 300 W lamp, supplied by OSRAM Gmbh. The black standard temperature is 65° C. The samples are irradiated periodically at room temperature for 16 hours dry, and under water for 8 hours. The Yellowness Index (YI) of these samples is determined according to ASTDM 1925-70. Low values denote minor discoloration, high values denote strong discoloration of the samples. The slighter the discoloration, the more effective the stabiliser composition. The results are reported in Table 11.

TABLE 11

Artificial weathering test, YI values after irradiation

| | Duration (hours) | | | | |
|---|---|---|---|---|---|
| Example | 0 | 24 | 100 | 200 | 300 |
| Example 3a | 28.8 | 46.5 | 46.7 | 54.1 | 73.3 |
| Example 3b | 8.9 | 34.1 | 86.4 | degradation | |
| Example 3c | 10.3 | 30.3 | 58.5 | 76.0 | 88.7 |

What is claimed is:

1. A composition comprising
   a) a chlorine-containing polymer
   b) at least one organotin compound of formula I to IV $$[R_1]_i Sn[-Q-R_2]_{4-i} \qquad (I)$$

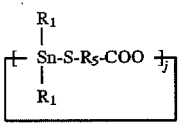

(II)

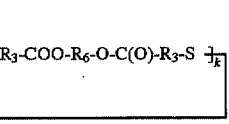

(III)

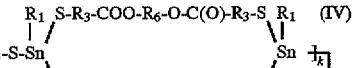

(IV)

wherein
$R_1$ is $C_1-C_{12}$alkyl or $C_1-C_8$alkoxycarbonylethyl,
Q is —S— or —O—CO—, and,
if Q is —S—,
$R_2$ is $C_8-C_{18}$alkyl, a radical —$R_3$—COO—$R_4$ or —$(CH_2)_2$—O—CO—$R_4$, or,
if Q is —O—CO—,
$R_2$ is phenyl which is unsubstituted or substituted by $C_1-C_4$alkyl;
$R_3$ is methylene, ethylene or o-phenylene,
$R_4$ is $C_5-C_{18}$alkyl,
$R_5$ is methylene, ethylene or o-phenylene,
$R_6$ is $C_2-C_4$alkylene or $C_4-C_8$alkylene which is interrupted by oxygen;
i is 1 or 2,
j is a number in the range from 1 to 6,
k is a number in the range from 1 to 3, and
   c) at least one phosphorus compound of formula V wherein $R_7$ is $C_4-C_{18}$alkyl, phenyl which is unsubstituted or substituted by $C_1-C_{12}$alkyl or —$CO_2R_8$; $C_4-C_{21}$alkanoyloxyalkyl, $C_3-C_{24}$alkoxycarbonylalkyl; $C_3-C_{24}$alkoxycarbonylalkyl in which the alkoxycarbonyl moiety is interrupted by oxygen, sulfur,

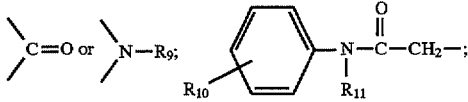

$C_9-C_{24}$phenylalkoxycarbonylalkyl which is unsubstituted or substituted in the phenyl ring by $C_1-C_{12}$alkyl; $C_9-C_{24}$phenylalkoxycarbonylalkyl which is unsubstituted or substituted in the phenyl ring by $C_1-C_{12}$alkyl, the bond between the phenyl ring and the alkoxycarbonylalkyl radical being interrupted by oxygen, sulfur,

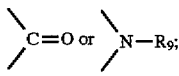

$C_7-C_{20}$cycloalkoxycarbonylalkyl or $C_5-C_{15}$cycloalkyl-$C_2-C_6$alkoxycarbonyl-$C_1-C_{12}$alkyl,
$R_8$ is $C_1-C_{18}$alkyl,
$R_9$ is hydrogen or $C_1-C_{18}$alkyl,
$R_{10}$ is hydrogen or $C_1-C_{12}$alkyl,
$R_{11}$ is hydrogen or $C_1-C_{18}$alkyl,
X is oxygen or sulfur, and
n is 0 or 1.

2. A composition according to claim 1, comprising as component c) at least one phosphorus compound of formula V, wherein
$R_7$ is $C_4-C_{18}$alkyl, phenyl which is unsubstituted or substituted by $C_1-C_{12}$alkyl or —$CO_2R_8$; $C_4-C_{21}$alkanoyloxyalkyl, $C_3-C_{24}$alkoxycarbonylalkyl; $C_3-C_{24}$alkoxycarbonylalkyl in which the alkoxycarbonyl moiety is interrupted by oxygen, sulfur,

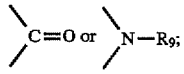

$C_9-C_{24}$phenylalkoxycarbonylalkyl which is unsubstituted or substituted in the phenyl ring by $C_1-C_{12}$alkyl; $C_9-C_{24}$phenylalkoxycarbonylalkyl which is unsubstituted or substituted in the phenyl ring by $C_1-C_{12}$alkyl, the bond between the phenyl ring and the alkoxycarbonylalkyl radical being interrupted by oxygen, sulfur,

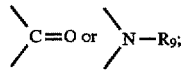

$C_7-C_{20}$cycloalkoxycarbonylalkyl or $C_5-C_{15}$cycloalkyl-$C_2-C_6$alkoxycarbonyl-$C_1-C_{12}$alkyl.

3. A composition according to claim 1, comprising as component b) at least one organotin compound of formula I to IV, wherein
$R_1$ is $C_1-C_{12}$alkyl,
if Q is —S—,
$R_2$ is $C_8-C_{18}$alkyl or a radical —$R_3$—COO—$R_4$, or,
if Q is —O—CO—,
$R_2$ is phenyl;
$R_3$ is methylene or ethylene, $R_4$ is $C_5$–$C_{18}$alkyl,
$R_5$ is ethylene or o-phenylene,
$R_6$ is $C_2$–$C_4$alkylene of $C_4$–$C_8$alkylene which is interrupted by oxygen,
i is 1 or 2,
j is a number from 1 to 4, and
k is 1 or 2.

4. A composition according to claim 1, comprising as component b) at least one organotin compound of formula I to IV, wherein
$R_1$ is $C_4$–$C_8$alkyl,
if Q is —S—,
$R_2$ is a radical —$R_3$—COO—$R_4$,
$R_3$ is methylene or ethylene,
$R_4$ is $C_8$–$C_{14}$alkyl,
$R_5$ is ethylene,
$R_6$ is ethylene,
i is 1 or 2,
j is a number from 1 to 4, and
k is 1 or 2.

5. A composition according to claim 1, wherein component b) is an organotin compound of formula I or III.

6. A composition according to claim 1, comprising as component c) at least one phosphorus compound of formula V, wherein
$R_7$ is $C_4$–$C_{12}$alkyl, phenyl which is unsubstituted or substituted by $C_1$–$C_8$alkyl or —$CO_2R_8$; $C_4$–$C_{12}$alkanoyloxyalkyl, $C_3$–$C_{18}$alkoxycarbonylalkyl; $C_3$–$C_{18}$alkoxycarbonylalkyl in which the alkoxycarbonyl moiety is interrupted by oxygen or

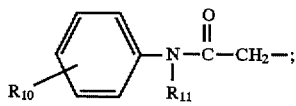

$C_9$–$C_{18}$phenylalkoxycarbonylalkyl which is unsubstituted or substituted in the phenyl ring by $C_1$–$C_8$alkyl; $C_9$–$C_{18}$phenylalkoxycarbonylalkyl which is unsubstituted or substituted in the phenyl ring by $C_1$–$C_8$alkyl, the bond between the phenyl ring and the alkoxycarbonylalkyl radical being interrupted by oxygen or

$C_7$–$C_{15}$cycloalkoxycarbonylalkyl or $C_5$–$C_{15}$cycloalkyl-$C_2$–$C_4$alkoxycarbonyl-$C_1$–$C_8$alkyl,
$R_8$ is $C_1$–$C_{12}$alkyl,
$R_9$ is hydrogen or $C_1$–$C_{12}$alkyl,
$R_{10}$ is hydrogen or $C_1$–$C_8$alkyl,
$R_{11}$ is hydrogen or $C_1$–$C_{12}$alkyl,
X is oxygen or sulfur, and
n is 0 or 1.

7. A composition according to claim 1, comprising as component c) at least one phosphorus compound of formula V, wherein
$R_7$ is $C_4$–$C_8$alkyl, phenyl which is unsubstituted or substituted by $C_1$–$C_4$alkyl or —$CO_2R_8$; $C_3$—$C_{18}$alkoxycarbonylalkyl, $C_3$–$C_{12}$alkoxycarbonylalkyl in which the alkoxycarbonyl moiety is interrupted by oxygen or

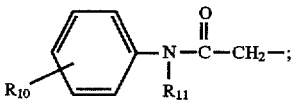

$C_9$–$C_{15}$phenylalkoxycarbonylalkyl which is unsubstituted or substituted in the phenyl ring by $C_1$–$C_4$alkyl; $C_7$–$C_{12}$cycloalkoxycarbonylalkyl or $C_5$–$C_{15}$cycloalkyl-$C_2$–$C_4$alkoxycarbonyl-$C_1$–$C_4$alkyl,
$R_8$ is $C_1$–$C_8$alkyl,
$R_9$ is hydrogen or $C_1$–$C_{12}$alkyl,
$R_{10}$ is hydrogen or $C_1$–$C_4$alkyl,
$R_{11}$ is hydrogen or $C_1$–$C_4$alkyl,
X is oxygen or sulfur, and
n is 0 or 1.

8. A composition according to claim 1, comprising as component c) at least one phosphorus compound of formula V, wherein
$R_7$ is phenyl which is unsubstituted or substituted by —$CO_2R_8$; $C_3$–$C_{15}$alkoxycarbonylalkyl, $C_3$–$C_9$alkoxycarbonylalkyl in which the alkoxycarbonyl moiety is interrupted by oxygen or

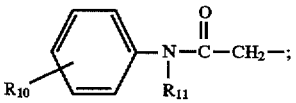

$C_9$—$C_{12}$phenylalkoxycarbonylalkyl, cyclohexyloxycarbonylethyl or $C_5$–$C_{10}$cycloalkyl-methoxycarbonylethyl, and
$R_8$ is $C_1$–$C_4$alkyl,
$R_9$ is hydrogen or $C_1$–$C_8$alkyl,
$R_{10}$ is hydrogen,
$R_{11}$ is $C_1$–$C_4$alkyl,
X is oxygen or sulfur, and
n is 0 or 1.

9. A composition according to claim 1, wherein the chlorine-containing polymer is or contains polyvinyl chloride.

10. A composition according to claim 1, wherein components (b) and (c) are present together in an amount from 0.05 to 5%, based on the weight of component (a).

11. A composition according to claim 1, wherein the weight ratio of the components (b):(c) is from 4:1 to 1:1.

12. A composition according to claim 1, additionally comprising lubricants, pigments, modifiers, processing agents, fillers, antioxidants and/or light stabilisers.

13. A process for stabilising a chlorine-containing polymer against oxidative, thermal or light-induced degradation, which comprises incorporating into, or applying to, said polymer at least one compound of formulae I to IV and at least one compound of formula V as defined in claim 1.

14. A stabilizing composition for a chlorine-containing polymer, which composition comprises (a) at least one organotin compound of formula I to IV

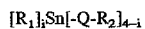    (I)

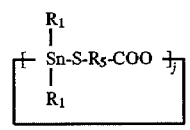    (II)

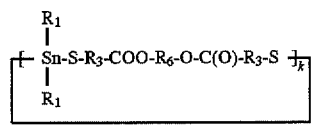    (III)

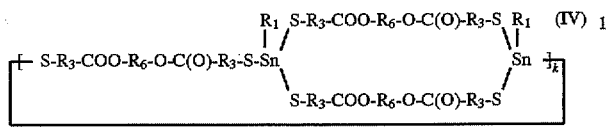    (IV)

wherein
$R_1$ is $C_1$–$C_{12}$alkyl or $C_1$–$C_8$alkoxycarbonylethyl,
Q is —S— or —O—CO—, and,
if Q is —S—,
$R_2$ is $C_8$–$C_{18}$alkyl, a radical —$R_3$—COO—$R_4$ or —$(CH_2)_2$—O—CO—$R_4$, or,
if Q is —O—CO—,
$R_2$ is phenyl which is unsubstituted or substituted by $C_1$–$C_4$alkyl;
$R_3$ is methylene, ethylene or o-phenylene,
$R_4$ is $C_5$–$C_{18}$alkyl,
$R_5$ is methylene, ethylene or o-phenylene,
$R_6$ is $C_2$–$C_4$alkylene or $C_4$–$C_8$alkylene which is interrupted by oxygen;
i is 1 or 2,
j is a number in the range from 1 to 6,
k is a number in the range from 1 to 3, and b) at least one phosphorus compound of formula V wherein
$R_7$ is $C_4$–$C_{18}$alkyl, phenyl which is unsubstituted or substituted by $C_1$–$C_{12}$alkyl or —$CO_2R_8$; $C_4$–$C_{21}$alkanoyloxyalkyl, $C_3$–$C_{24}$alkoxycarbonylalkyl; $C_3$–$C_{24}$alkoxycarbonylalkyl in which the alkoxycarbonyl moiety is interrupted by oxygen, sulfur,

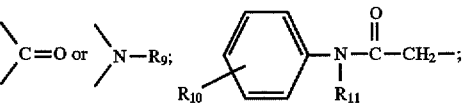

$C_9$–$C_{24}$phenylalkoxycarbonylalkyl which is unsubstituted or substituted in the phenyl ring by $C_1$–$C_{12}$alkyl; $C_9$–$C_{24}$phenylalkoxycarbonylalkyl which is unsubstituted or substituted in the phenyl ring by $C_1$–$C_{12}$alkyl, the bond between the phenyl ring and the alkoxycarbonylalkyl radical being interrupted by oxygen, sulfur,

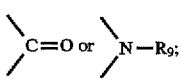

$C_7$–$C_{20}$cycloalkoxycarbonylalkyl or $C_5$–$C_{15}$cycloalkyl-$C_2$–$C_6$alkoxycarbonyl-$C_1$–$C_{12}$alkyl,
$R_8$ is $C_1$–$C_{18}$alkyl,
$R_9$ is hydrogen or $C_1$–$C_{12}$alkyl,
$R_{10}$ is hydrogen or $C_1$–$C_{12}$alkyl,
$R_{11}$ is hydrogen or $C_1$–$C_{18}$alkyl,
X is oxygen or sulfur, and
n is 0 or 1.

* * * * *